US011467406B2

(12) United States Patent
Chatterjee et al.

(10) Patent No.: US 11,467,406 B2
(45) Date of Patent: Oct. 11, 2022

(54) FIELD OF VIEW EXPANDING SYSTEM

(71) Applicant: Microsoft Technology Licensing, LLC, Redmond, WA (US)

(72) Inventors: Ishan Chatterjee, Mountain View, CA (US); Bernard Charles Kress, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 16/586,660

(22) Filed: Sep. 27, 2019

(65) Prior Publication Data
US 2021/0096369 A1 Apr. 1, 2021

(51) Int. Cl.
*G02B 27/01* (2006.01)
*B82Y 35/00* (2011.01)
*F21V 8/00* (2006.01)
*G02B 27/00* (2006.01)

(52) U.S. Cl.
CPC .......... *G02B 27/0172* (2013.01); *B82Y 35/00* (2013.01); *G02B 6/0016* (2013.01); *G02B 6/0076* (2013.01); *G02B 27/0081* (2013.01); *G02B 2027/0125* (2013.01)

(58) Field of Classification Search
CPC .............................. B82Y 35/00; G02B 1/002; G02B 2005/1804; G02B 2027/0125; G02B 2207/101; G02B 27/0037; G02B 27/0081; G02B 27/0172; G02B 6/0016; G02B 6/0076
See application file for complete search history.

(56) References Cited

U.S. PATENT DOCUMENTS

| 9,400,395 | B2 | 7/2016 | Travers et al. |
| 10,254,454 | B2 | 4/2019 | Klug et al. |
| 10,345,519 | B1 | 7/2019 | Miller et al. |
| 10,895,741 | B2 | 1/2021 | Chou et al. |
| 2017/0322418 | A1 | 11/2017 | Lin et al. |
| 2018/0052277 | A1 | 2/2018 | Schowengerdt et al. |

(Continued)

FOREIGN PATENT DOCUMENTS

WO 2019136166 A1 7/2019

OTHER PUBLICATIONS

Hong, Chuchuan, "Meta-Form Near Eye Visor", In Thesis submitted in partial fulfillment of the requirements for the degree of Master of Science in Electrical Engineering, Jan. 1, 2017, 57 Pages.
(Continued)

*Primary Examiner* — Joseph P Martinez
*Assistant Examiner* — Vipin Patel
(74) *Attorney, Agent, or Firm* — Rainier Patents, P.S.

(57) ABSTRACT

This document relates to an optical device using waveguide that can enable propagation of large field of view images by use of metasurfaces, without the necessity of increasing the reflective index associated with the waveguide. An optical assembly can generate a compressed image corresponding to a wide field of view in order to ensure that the image can propagate through the waveguide according to TIR limits of the waveguide. The compressed image can be provided to a standard grating in-coupler, and can then be expanded by a metasurface out-coupler of the optical device to reproduce the wide field of view.

20 Claims, 11 Drawing Sheets

(56) References Cited

U.S. PATENT DOCUMENTS

| | | |
|---|---|---|
| 2018/0052501 A1 | 2/2018 | Jones et al. |
| 2018/0113310 A1 | 4/2018 | Rolland et al. |
| 2018/0252857 A1* | 9/2018 | Glik .................. G02B 1/002 |
| 2018/0284882 A1* | 10/2018 | Shipes .................. G06F 3/012 |
| 2019/0121126 A1 | 4/2019 | Simmonds |
| 2019/0227319 A1 | 7/2019 | Trail et al. |
| 2021/0096370 A1 | 4/2021 | Kress et al. |
| 2021/0173210 A1 | 6/2021 | Elazhary et al. |

OTHER PUBLICATIONS

Lee, et al., "Metasurface Eyepiece for Augmented Reality", In Journal of Nature Communications, vol. 9, Nov. 1, 2018, 10 Pages.

"Non Final Office Action Issued in U.S. Appl. No. 16/586,708", dated Jun. 23, 2021, 11 Pages.

Kamali, et al., "A Review of Dielectric Optical Metasurfaces for Wavefront Control", In Journal of Nanophotonics vol. 7, Issue 6, May 18, 2018, pp. 1041-1068.

"International Search Report and Written Opinion Issued in PCT Application No. PCT/US20/038279" dated Oct. 12, 2020, 16 Pages.

"International Search Report and Written Opinion Issued in PCT Application No. PCT/US20/038277", dated Sep. 25, 2020, 16 Pages.

"Final Office Action issued in U.S. Appl. No. 16/586,708", dated Feb. 2, 2022, 14 Pages.

"Notice of Allowance Issued in U.S. Appl. No. 16/586,708", dated May 13, 2022, 10 Pages.

\* cited by examiner

FIELD OF VIEW EXPANDING SYSTEM

BACKGROUND

Display technology is advancing in the areas of augmented reality (AR) and virtual reality (VR) to provide users with more immersive visual experiences. For example, in some AR applications, generated imagery can be displayed to a user via a transparent display that also allows the user to view the surrounding physical environment. The generated imagery enhances or augments the user's experience or knowledge of the surrounding physical environment.

In some implementations an optical waveguide can be used to spatially translate a generated image from one position to another position in an optical system. For example, in a near-eye display (NED) device, an optical waveguide made of a substrate can spatially translate propagating light waves representing imagery generated by a light engine and convey them along an optical path toward one or both eyes of a user. Such technology may be incorporated into an NED device in the form of eyeglasses, goggles, a helmet, a visor, or some other type of head-mounted display (HMD) device or eyewear.

However, for typical NED devices, reproduction of an image having a wide field of view (FOV) can be difficult, as existing techniques for increasing FOV can require the use of waveguide substrates that have a high reflective index, which can be difficult to procure, and also significantly increases costs associated with the device. As such, while NED devices can provide a wide FOV by use of higher index substrates, there remain difficulties in generating a wide FOV using less expensive materials that are readily available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for providing wide field of view images in an NED device. One example includes a device that includes an optical assembly configured to generate an image for propagation from a first point of the device to a second point of the device via a waveguide having a transmissive substrate, an in-coupler, and an out-coupler, the in-coupler comprising a deflection grating that provides a constant deflection angle for angles of incidence associated with the generated image and being configured to propagate the generated image through the transmissive substrate of the waveguide to the out-coupler, and the out-coupler comprising a metasurface grating that provides a non-constant deflection angle for angles of incidence associated with the generated image, the metasurface grating increasing a field of view (FOV) of the generated image.

Another example includes a method or technique that can be performed on a device. The method can include generating an image that has a compressed field of view (FOV) based on a wide FOV image, coupling the generated image into an in-coupler of a waveguide, the in-coupler having a first grating, propagating the generated image via a transmissive substrate of the waveguide, coupling the generated image into an out-coupler of the waveguide, the out-coupler having a second grating that provides FOV expansion to recreate the wide-FOV image, and propagating the recreated wide-FOV image for display.

Another example includes a device including a renderer configured to process an image having a first field of view (FOV) to generate an image having a second FOV, a light engine configured to produce light waves based on the generated image having the second FOV, and a waveguide in-coupler configured to couple the produced light waves to a waveguide out-coupler via a transmissive substrate of the waveguide, the waveguide out-coupler configured to expand the generated image having the second FOV to recreate the first FOV.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
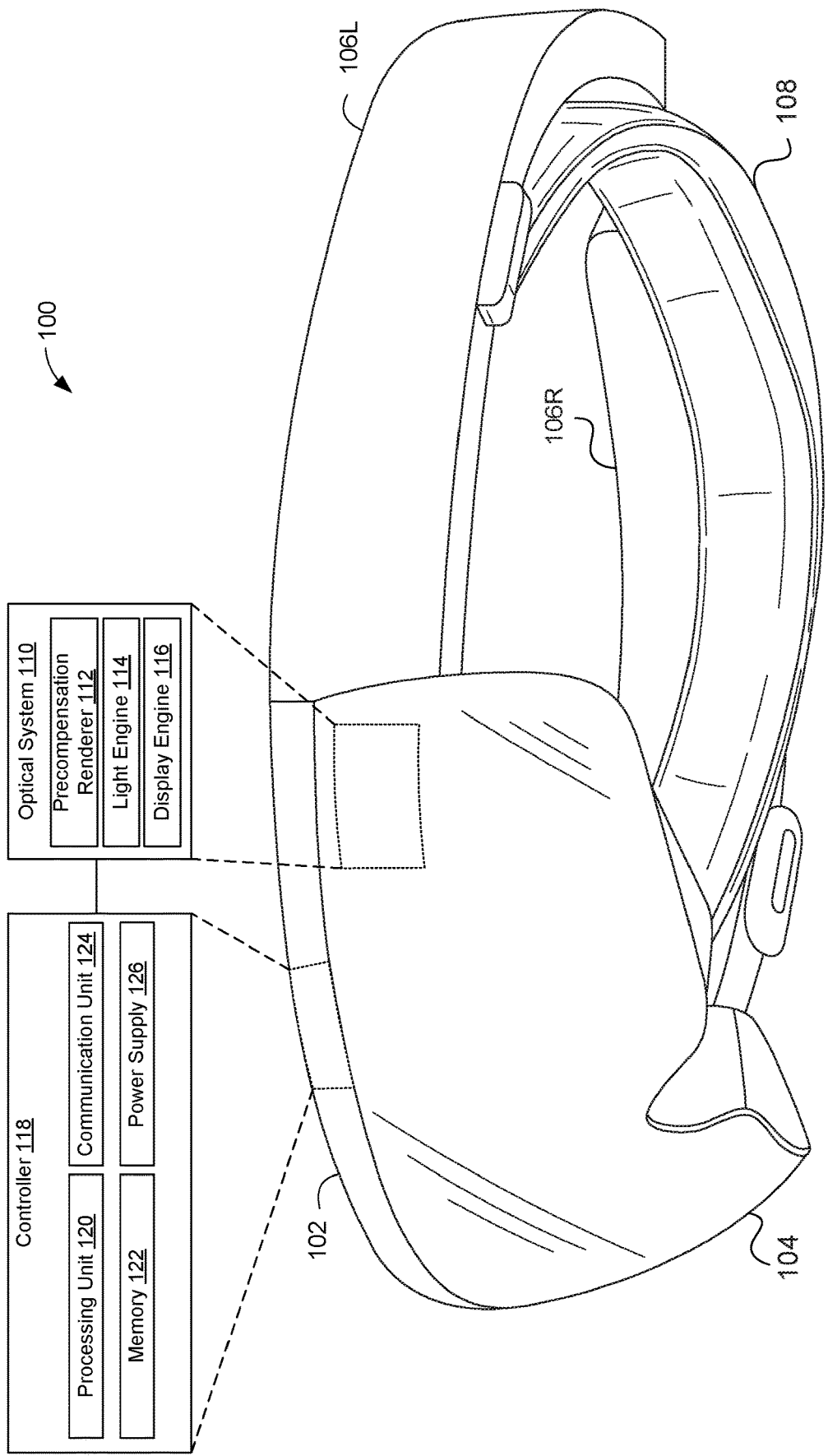
FIGS. 1-4 illustrates an example device that is consistent with some implementations of the present concepts.

Certain NED devices, such as HMD devices, can include optical systems for spatially translating a generated image from one position to another position, for example from a light engine to an eye of a user. Such optical systems can include one or more transparent waveguides arranged so that they are located directly in front of each eye of the user when the NED device is worn by the user, to project light representing generated images into the eye of the user. In NED devices that utilize these waveguides, light can propagate through the waveguides over certain internal angles. Light propagating at some non-zero angle of incidence to a surface of the waveguide can travel within the waveguide via a transmissive substrate, bouncing back and forth between the surfaces via total internal reflection (TIR).

With such a configuration, images generated by the NED device can be overlaid on the user's view of the surrounding physical environment. One aspect of translating a generated image from one position to another via a waveguide involves receiving the light waves into the waveguide ("in-coupling") at a first location and outputting the light waves from the waveguide ("out-coupling") at a second location. Light waves can be in-coupled to and out-coupled from a waveguide via an optical element that may function as an optical input port or an optical output port for the light waves. For example, in some implementations, an optical coupling element configured to in-couple and/or out-couple light waves can comprise a diffractive optical element (DOE). Such a DOE may be a grating structure such as a surface relief grating (SRG). However, it is to be appreciated that other types of outcouplers can be used with NED devices, such as binary or multilevel relief gratings, volume holograms, resonant waveguide gratings, partially reflective mirrors, etc.

The angle of deflection of light waves resulting from deflection by a DOE, such as an SRG, can be a constant deflection angle over all angles of incidence (also referred to herein as a constant momentum change of angles of incidence). Therefore, for a given wavelength, an incoming light wave at incident angle θ to the normal would receive a constant angular change β, and would therefore exit the SRG at an angle θ+β. However, In the context of an optical waveguide for an NED device, this angular change caused by the optical coupling elements can limit the ability to provide a wide FOV for the NED device.

When using optical coupling elements such as SRGs, the FOV for any image produced by a light engine of the NED device can be limited based on the TIR critical angles of the waveguide, which directly correlates to the index of the transmissive substrate of the waveguide. In certain implementations, the transmissive substrate may be glass, and while increasing the refractive index of the glass or other such substrate may improve the TIR critical angles, allowing higher FOV, such high index substrates are both rare and expensive. As such, while a wide FOV image can be sent to the waveguide via an SRG coupler, a portion of the image may be undesirably cropped due to the limited TIR capabilities of the waveguide.

As an alternative to using optical coupling elements such as SRGs, which provides for a constant angular change, metasurfaces that utilize sub-wavelength sized structures, such as nanostructures (i.e., structures that are nanoscale elements), can be used to significantly increase the FOV. By specifying the design of the structures on the metasurface, a phase profile of the metasurface can be created that allows for tailoring of angle-dependent properties. Such nanostructures can be composed of a semiconductor, an oxide (e.g., a metal or non-metal oxide), a nitride (e.g., a metal or non-metal nitride), a sulfide (e.g., a metal or non-metal sulfide), a pure element, or a combination of two or more of these.

Certain nanostructures can be assembled to form a metasurface that can provide a compression/expansion of the FOV by way of a linear momentum change, or angular "kick." This compression/expansion ratio term can be represented by a constant multiplicative term μ, such that for incident angles greater in magnitude, the angular "kick" would be greater. Upon interaction with the nanostructures, the outgoing angle can be μθ+β, which can result in an approximately linear relationship between incoming and outgoing angles. Thus, such metasurfaces can provide a tailored angular change, rather than the constant angular change provided by conventional optical coupling elements, such as SRGs. Such a metasurface may be referred to as an Engineered Angular Dispersion Metasurface (EADM).

Using EADMs in place of SRG couplers can allow for an optical system associated with the NED device to paint a large FOV image, and based on the nanostructures associated with the metasurfaces, the light waves associated with such a large FOV image can be given the necessary angular "kick" in order to ensure that a wide FOV image is effectively compressed as a result of the in-coupler EADM, ensuring that the compressed image is not cropped by the maximum TIR angles associated with the waveguide substrate. Then, at the end of the waveguide, an out-coupler EADM can be used to expand the FOV back to the original angular range produced by the light engine.

However, even with such metasurfaces, achieving a wide FOV image can be difficult because the compression and expansion of the image via the in-coupler and out-coupler EADMs can result in discrepancies between the input image and the resulting image shown to the user. More specifically, because of the challenges in design and repeatable manufacture of the nanostructures on the metasurfaces, production of completely symmetrical metasurfaces for the in-coupler and out-coupler can be difficult, and when identical symmetry is not achieved, the resulting image displayed to a user may not be a faithful reproduction of the input image.

Furthermore, while the use of EADMs for both in-coupling and out-coupling can produce a wide FOV image, the optical system may require a larger and more expensive light engine in order to generate such a wide FOV. Finally, while EADMs can be created to provide specific angular "kicks" based on the incident angle, the linearity of the angular "kick" can limit the capabilities of the NED device.

Accordingly, implementations disclosed herein are directed to a waveguide-based optical device that can increase the FOV without incurring potentially high costs associated with the NED device by use of, for example, high refractive index substrates, while also avoiding the difficulties posed by utilizing EADMs as both an in-coupler and an out-coupler. Specifically, an optical system can be provided that precompensates an image to provide, from the optical system, a compressed image for in-coupling to the waveguide. Upon generation of the compressed image, a standard DOE can be used in place of a specialized metasurface, such as an EADM, for coupling of the image to the waveguide, thereby reducing the need to utilize two separate EADMs. Additionally, the device can utilize metasurfaces that can be designed so as to provide a nonlinear angular "kick," which allows for additional benefits to be obtained over the use of linearly deflecting EADMs, such as the ability to provide foveation and distortion correction to the resulting image.

Example Device

FIG. 1 depicts an example NED device 100 in which the methods discussed herein can be incorporated. The NED device 100 may provide VR and/or AR display modes for a user, i.e., the wearer of the device. To facilitate description, it is henceforth assumed that the NED device 100 is an HMD device designed for AR visualization.

As depicted in FIG. 1, NED device 100 can include a chassis 102, along with a protective visor 104, left side arm 106L, and right side arm 106R, which all may be mounted to chassis 102. Visor 104 may be a transparent material that can form a protective enclosure for various display elements coupled to the visor that are discussed below. Chassis 102 may provide a mounting structure for visor 104 and side arms 106A and 106B, and may be further connected to an adjustable headband 108 that enables wearing of NED device 100 on a user's head. An optical system 110 mounted to chassis 102 and enclosed within protective visor 104 can generate images for AR visualization, and is described in greater detail below.

In one implementation, optical system 110 may include a precompensation renderer 112, which may perform rendering of an image that is to be displayed to a user of NED device 100. Precompensation renderer 112 may render a precompensated image (processing details of which are described below) that can be provided to light engine 114, which may generate light waves representing the image for displaying via NED device 100. Precompensation renderer 112 may be either a hardware or software renderer, and may be configured to precompensate a wide FOV image into a compressed FOV image for coupling to a waveguide, which will be discussed in further detail below with respect to FIG. 6.

Light engine 114 may be any sort of device capable of emitting light sources, such as one or more light emitting diodes or laser diodes. Optical system 110 may also include a display engine 116 for consolidating light waves generated by light engine 114 and directing the light waves as appropriate. In one implementation, display engine 116 may be a micromechanical system (MEMS)-based scanning system that can "paint" an image based on light waves produced by light engine 114.

Protective visor 104 and/or chassis 102 may also house controller 118, which may provide various components for providing functionality to NED device 100. In one implementation, controller 118 may include various components such as a processing unit 120, a memory 122 accessible to the processing unit 120 for storing processor readable instructions and data, and a communication module 124 communicatively coupled to the processing unit 120 which can act as a network interface for connecting the NED device to another computer system. Processing unit 120 may include one or more processors including a central processing unit (CPU) and/or a graphics processing unit (GPU). Memory 122 can be a computer-readable storage media that may store instructions for execution by processing unit 120, to provide various functionality to NED device 100. Finally, a power supply 126 can provide power for the components of controller 118 and the other components of NED device 100, such as optical system 110 and additional components that may be included in NED device 100, such as image capture devices (e.g. cameras), audio devices (e.g. microphones and speakers), and location/motion capture devices (e.g. accelerometers).

Figure 2A:
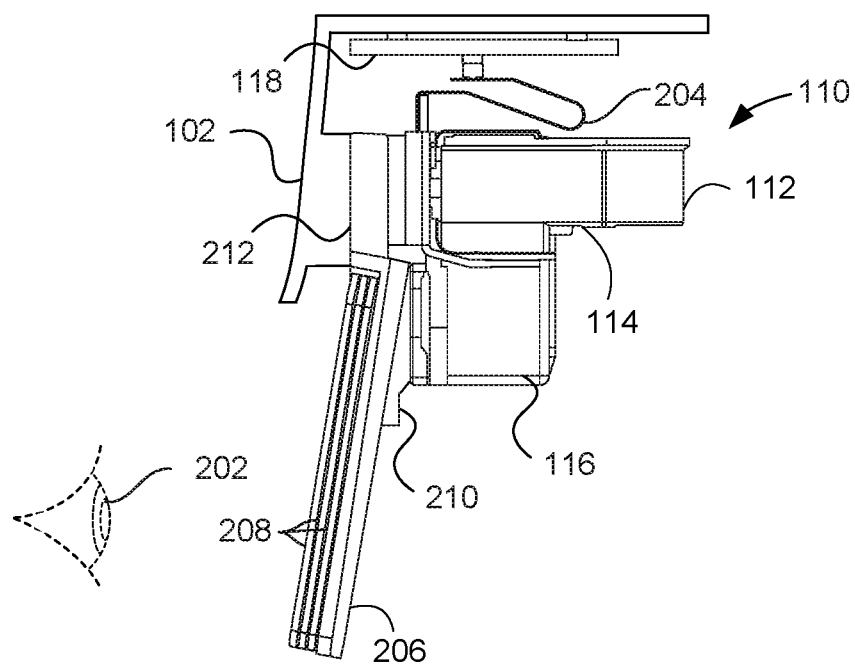
Figure 2B:
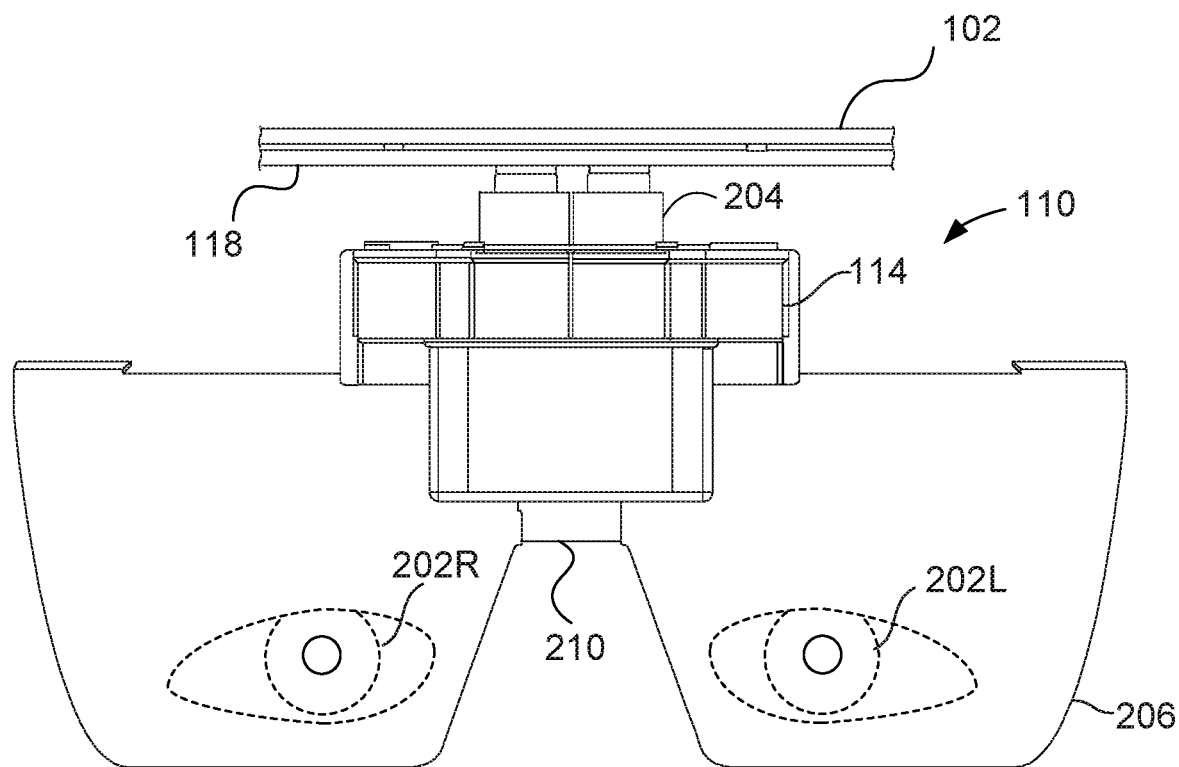

FIGS. 2A and 2B depict, in accordance with certain implementations, right side and front orthogonal views, respectively, of aspects that may be part of optical system 110 and may be contained within protective visor 104 of NED device 100 for propagation of imagery toward a user's eye 202. During operation of NED device 100, the display components can be positioned relative to the user's left eye 202L and right eye 202R as shown. The display components can be mounted to an interior surface of the chassis 102, which is shown in cross-section in FIG. 2A.

The display components can be designed to overlay three-dimensional images on the user's view of his real-world environment, e.g., by projecting light into the user's eyes. An image that is generated by precompensation renderer 112 can be provided to light engine 114, and light waves from light engine 114 may be directed by way of display engine 116, such that the light can be projected into the user's eyes. Furthermore, optical system 110 may be connected via a flexible circuit connector 204 to controller 118 for controlling the generation of light waves.

The display components can further include a waveguide carrier 206 to which optical system 110 can be mounted. Waveguide carrier 206 may include one or more waveguides 208 stacked on the user's side of the waveguide carrier 206, for each of the left eye and right eye of the user. The waveguide carrier 206 may have a central nose bridge portion 210, from which its left and right waveguide mounting surfaces can extend. One or more waveguides 208 can be stacked on each of the left and right waveguide mounting surfaces of the waveguide carrier 206, for receiving light emitted from light engine 114, and projecting such light into user's left eye 202L and right eye 202R of the user. Optical system 110 can be mounted to chassis 102 through a center tab 212 located at the top of waveguide carrier 206 over the central nose bridge portion 210.

Figure 3:
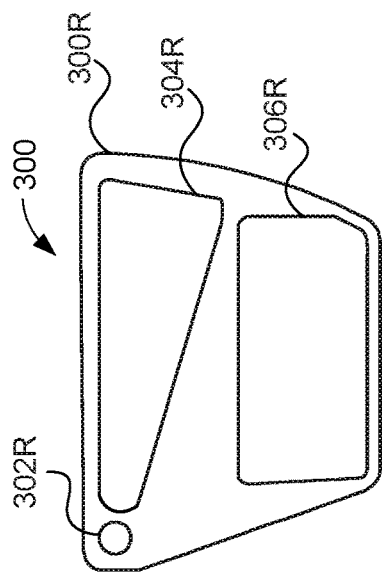

FIG. 3 depicts a waveguide 300R, which can be mounted on the waveguide carrier 206 to convey light to a particular eye of the user, in this example, the right eye of user. A similar waveguide can be designed for the left eye, for example, as a (horizontal) mirror image of the waveguide shown in FIG. 3. The waveguide 300R can be transparent and, as can be seen from FIGS. 2A and 2B, can be disposed directly in front of the right eye of the user during operation of NED device 100, e.g., as one of the waveguides 208 in FIG. 2A. Waveguide 300R is therefore shown from the user's perspective during operation of NED device 100.

Waveguide 300R can include a single optical input port 302R (also called an in-coupling element) located in the region of the waveguide 300R that may be closest to the user's nose bridge when NED device 100 is worn by the user. In certain embodiments the input port 302R can be a diffractive optical element such as a surface relief grating, or can be an EADM.

Waveguide 300R can further include a transmission channel 304R and an optical output port 306R (also called out-coupling element). As with input port 302R, in certain implementations, output port 306R can be a DOE, such as an SRG, or can be an EADM. An optical coupling (not shown) can provide light output from display engine 116 to input port 302R of waveguide 300 during operation.

Transmission channel 304R may be a transmissive substrate that can convey light from the input port 302R to output port 306R. In some implementations, transmission channel 304R may be a DOE, such as an SRG, or a reflective component such as a substrate with multiple internally reflective surfaces. The transmission channel 304R a may be configured to transmit light by use of TIR, such that light waves received at input port 302R can be transmitted to output port 306R. Light waves representing an image for the right eye may then be projected from output port 306R to the user's eye.

Figure 4:
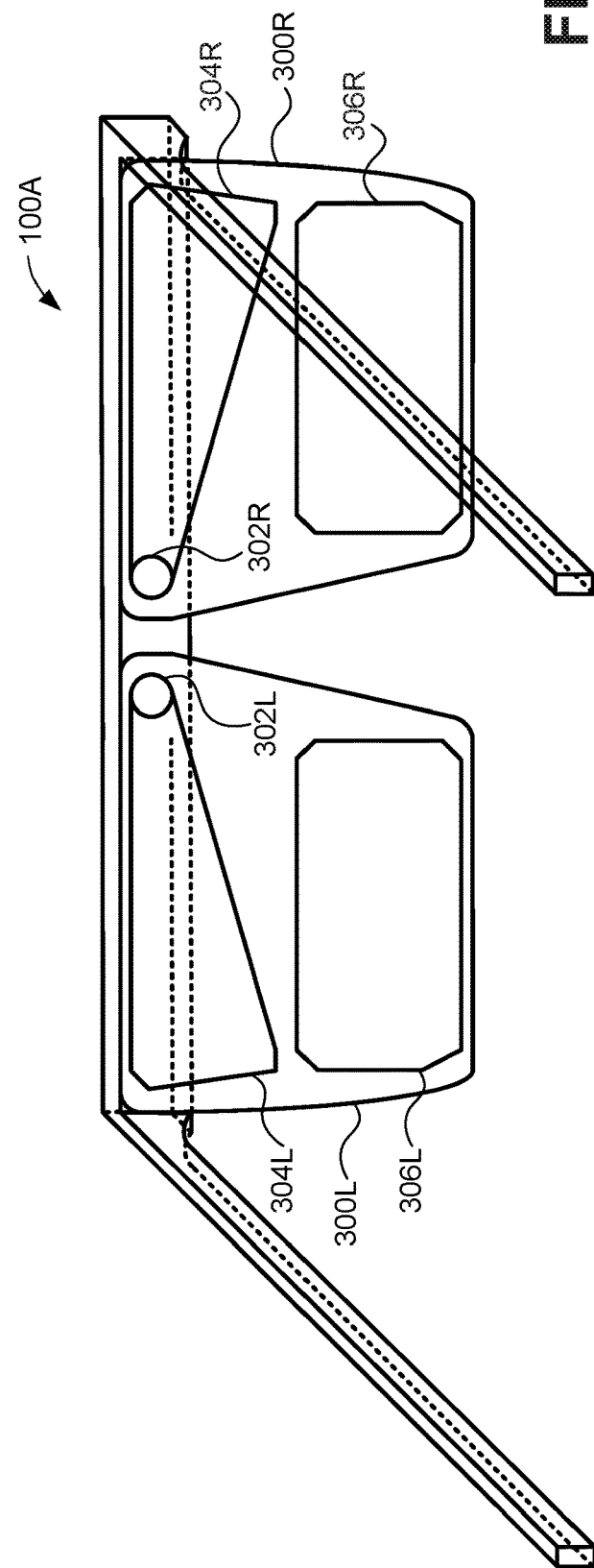

FIG. 4 depicts waveguide 300R when placed within an alternative NED device 100A. As depicted in FIG. 4, waveguide 300R may have a mirror waveguide that provides similar functionality for the left eye, via waveguide 300L. Similar to waveguide 300R, waveguide 300L also includes an input port 302L, a transmission channel 304L, and an output port 306L for enabling projection of light waves to the user's eye.

Figure 5:
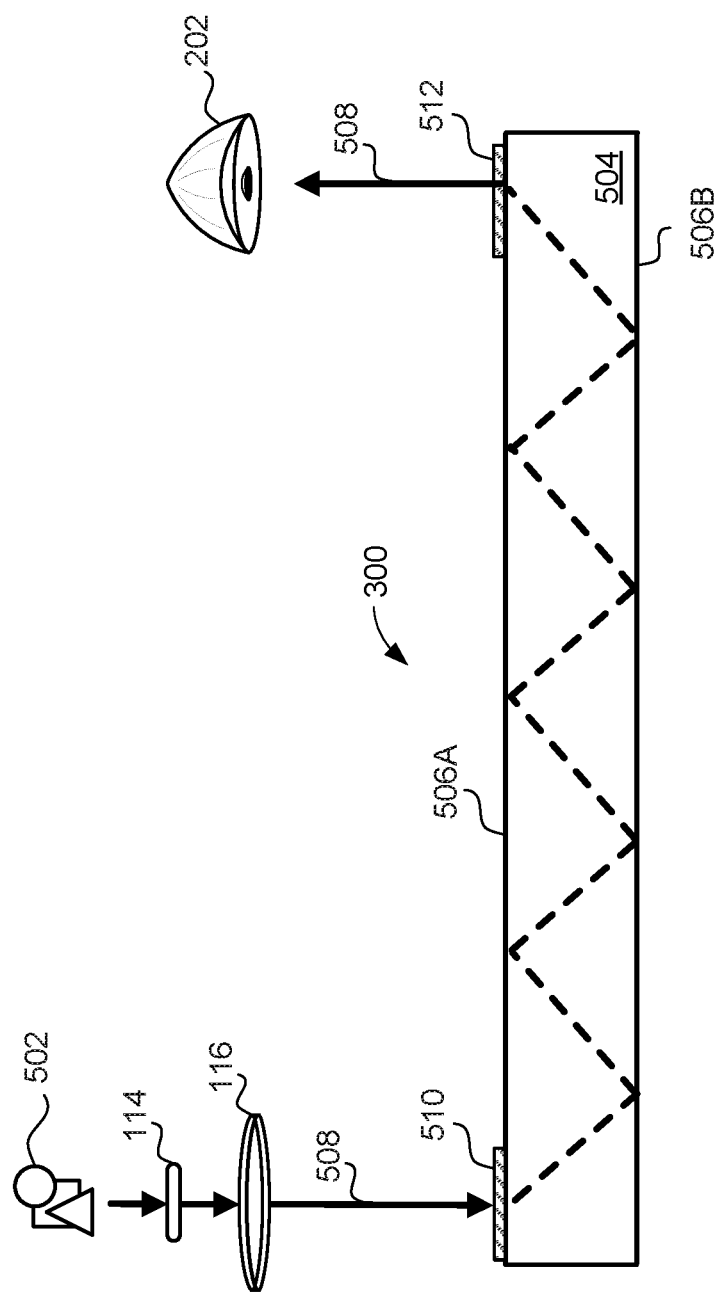
FIGS. 5-11 illustrate example techniques that are consistent with some implementations of the present concepts.

FIG. 5 illustrates the propagation of light waves using in-coupling and out-coupling elements via a waveguide, such as waveguide 300, whereby an image 502 that has been compressed by precompensation renderer 112 can be propagated to user's eye, such as user's eye 202. As depicted, waveguide 300 may include a transmissive substrate 504, which is manifest as an example transmission channel 304 with surface 506A and surface 506B that may be substantially parallel to each other and that may be internally reflective so as to provide TIR of light waves 508 propagating within transmissive substrate 504. Light waves 508 associated with image 502 may be generated by light engine 114, and sent to display engine 116. Waveguide 300 may also include an in-coupling element 510, which is manifest as an example input port 302, and may be configured to input light waves 508 to transmissive substrate 504, for example, by deflecting the light waves 508 at an angle suitable for TIR.

Waveguide 300 can also include an out-coupling element 512, which is manifest as an example output port 306, and may be configured to output light waves 508 from transmissive substrate 504. As previously discussed, in-coupling element 510 and out-coupling element 512 may in some cases include DOEs such as an SRG, or may be an EADM, which may be formed as part of or proximate to a given surface (i.e., a surface parallel to the direction of propagation of the light waves within the substrate) of transmissive substrate 504. For example, the embodiment illustrated in FIG. 5 depicted in-coupling element 510 and out-coupling element 512 formed on surface 506A of transmissive substrate 504, or may be located immediately proximate to surface 506A, such as within one micrometer from the surface.

Transmissive substrate 504 can be made of any material or combination of materials with appropriate optical properties to facilitate light propagation by TIR. In some embodiments, transmissive substrate 504 can be made of optical-grade glass, for example, formed through an injection molding process. The glass used to form transmissive substrate 504 can, in some implementations, include silicon dioxide (SiO2). Alternatively, in other implementations, transmissive substrate 504 may be formed of a polymer resin.

Example Precompensation Processing

Figure 6:
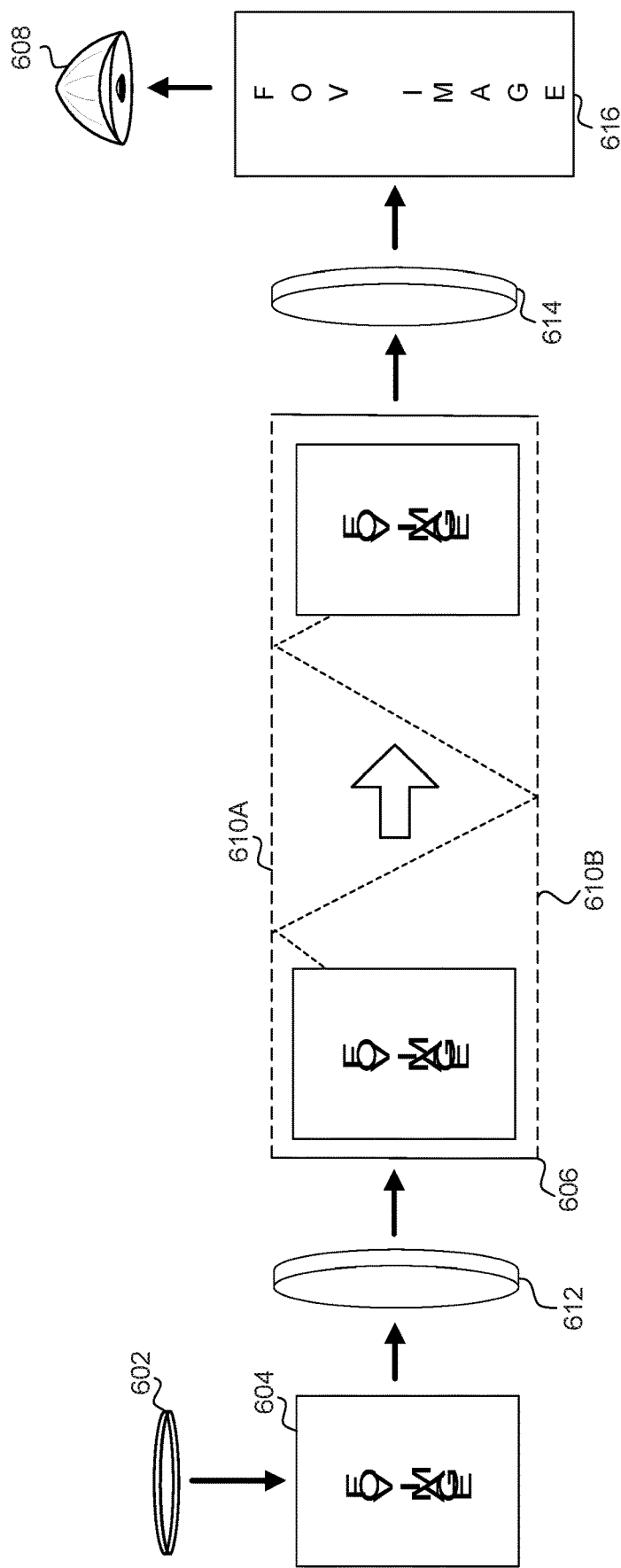

FIG. 6 depicts the processing of an image by NED device 100 according to one implementation. An optical assembly 602, such as a MEMS mirror-based display engine, may generate an image 604 that is to be transmitted via a waveguide 606 such that the image may be propagated to a user's eye 608. In some implementations, waveguide 606 may be of a low index transmissive substrate, such as glass, that may be limited in its ability to guide certain light waves according to TIR.

Specifically, in one implementation, waveguide 606 may have a minimum TIR angle 610A and a maximum TIR angle 610B, which are the critical guide angles associated with the particular index of waveguide 606. That is, minimum TIR angle 610A and maximum TIR angle 610B define the bounds of the field of view that can be propagated via TIR through waveguide 606. Minimum TIR angle 610A may be approximately equal to arcsin (1/n), where n is the refractive index of waveguide 606, and maximum TIR angle 610B may be approximately 75 degrees for waveguide 606. The FOV of a resulting image can therefore be based on the difference between the angles of incidence of the incoming light waves output from optical assembly 602 and the minimum and maximum TIR angles for waveguide 606, and if incoming light waves exhibit a FOV that exceeds than the minimum and maximum TIR angles, certain portions of the resulting image can be cropped following out-coupling of the image from the waveguide.

While the use of EADM couplers may assist in compressing a wide FOV image for transmission through a lower FOV waveguide, as discussed earlier, the use of EADMs for both in-coupling and out-coupling introduces difficulties in faithfully reproducing an exact copy of the input image, due to difficulties in creating symmetrical metasurfaces for the EADMs. Furthermore, the optical assembly associated with a device that utilizes EADMs for both in-coupling and out-coupling must be larger and more expensive in order to house a display engine that can generate the large FOV for the initial image.

To address such difficulties, and because an image having a wide FOV may be outside of the critical TIR angles for waveguide 606, precompensation by optical assembly 602 can be utilized. Specifically, the image generated by optical assembly 602 may be generated in a compressed fashion, and the FOV of the compressed image can be smaller than the wide FOV of the image that is ultimately output and displayed via NED device 100. In one implementation, the painted image generated by optical assembly 602 may depict a base image that, upon generation, appears as if compression has been applied to the image. Therefore, as depicted in FIG. 6, image 604 may be perceived as distorted if viewed directly from the output of optical assembly 602. However, as a user of NED device 100 is only intended to see the final image projected on user's eye 608, the distortion of image 604 will not be noticeable to the user.

Image 604, in its compressed form, can then be provided to in-coupler 612, which may be a standard grating in-coupler, such as an SRG, without the necessity of utilizing metasurfaces for the in-coupler because the image 604 is already within the critical TIR angles of waveguide 606. Image 604 can then be transferred through waveguide 606 by TIR, and can be provided to out-coupler 614. Out-coupler 614 may be an EADM that is capable of performing FOV expansion, such as by use of a linear momentum change. Furthermore, in some implementations, the EADM may utilize a non-linear momentum change, as will be discussed in further detail below. As a result of image 604 being expanded by out-coupler 614, expanded image 616 can be created, which can be propagated to user's eye 608 in order to provide a wide FOV image that does not have any distortion.

As such, the generation of a compressed image 604 allows the use of a standard in-coupler for in-coupler 612, reducing the requirement that the dual EADM in-coupler and out-coupler configurations be completely symmetric in their metasurface architecture. Furthermore, because optical assembly 602 does not need to produce a wide FOV and instead paints a compressed image that can later be expanded by out-coupler 614, optical system 602 can be of a smaller size than what would necessary to create the larger FOV image, which may result in cost savings, a reduction in size, and an increase in reliability. For example, when optical assembly 602 is a MEMS-based scanning system, the mirror swing angle can be reduced as a result of the methods described above.

In another implementation, the generation of a compressed image 604 can be used to compensate for distortions, amplitude (brightness), or geometrical aberrations imparted by components of the device, such as optical assembly 602, or by one of in-coupler 612 or out-coupler 614, or both. For example, if it is known that particular in-couplers or out-couplers yield certain aberrations, optical assembly 602 may precompensate for such aberrations when generating compressed image 604, in addition to the FOV compression being applied to the image.

Example Non-Linear Angular Momentum Processing

Figure 7:
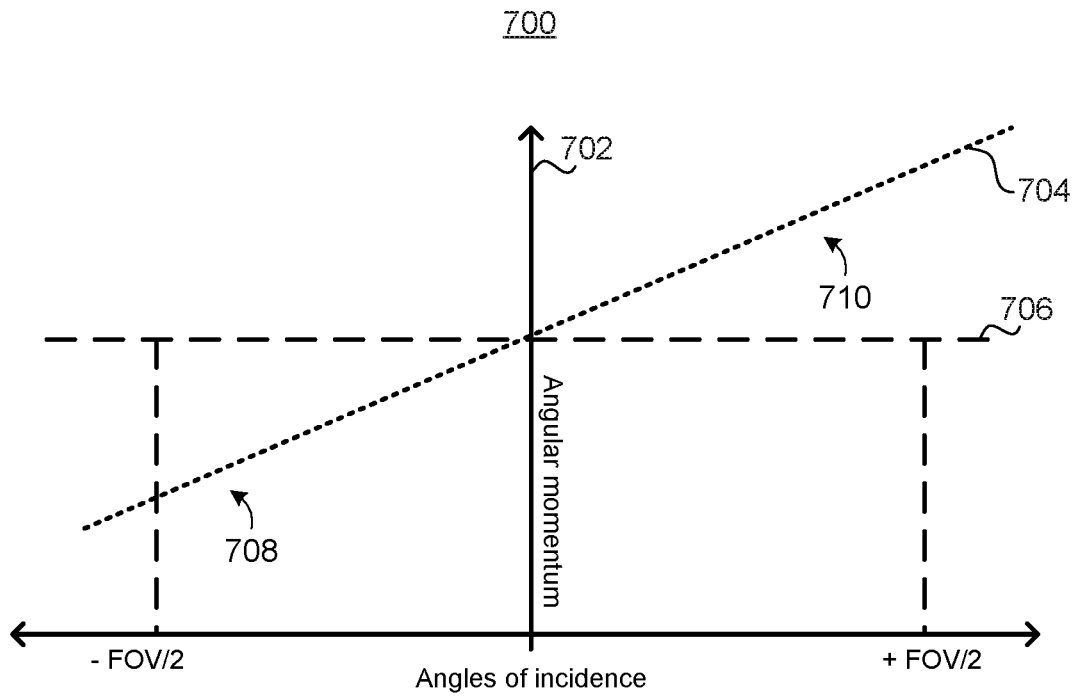
Figure 8:
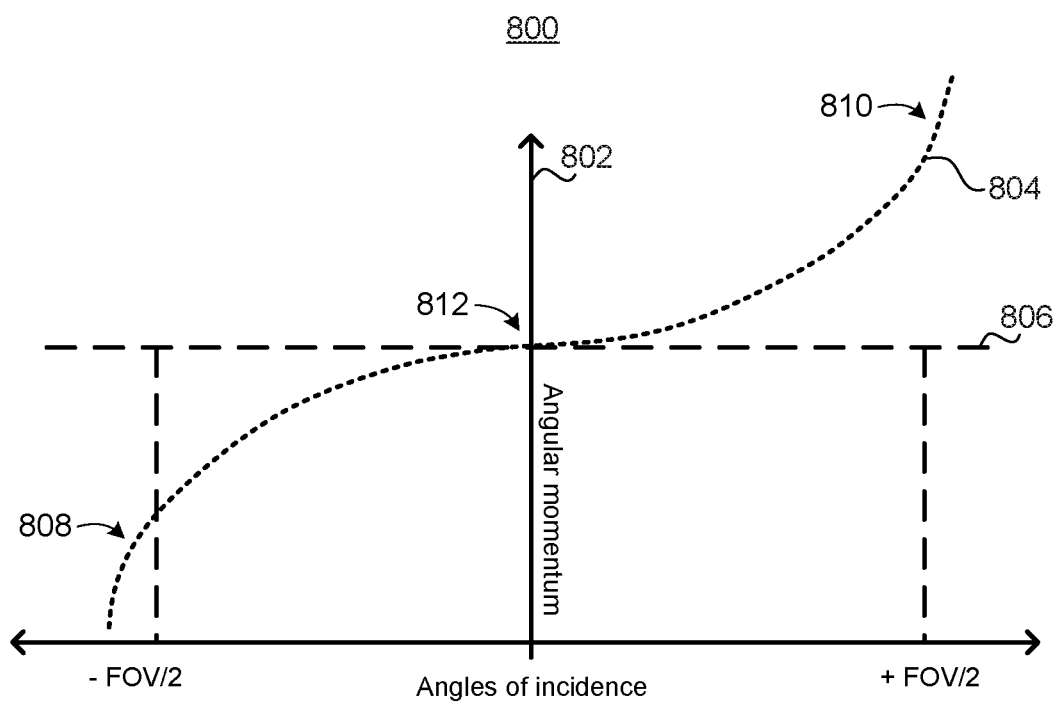

FIGS. 7 and 8 depict example angular momentum processing that can be performed by NED device 100 based on the type of in-couplers and out-couplers used in the connection with the waveguides of the device. As depicted in FIG. 7, graph 700 shows for a given angular momentum associated with a light wave 702 the use of an EADM coupler vs. the use of a standard grating, such as an SRG. Specifically, graph 700 depicts an EADM linear dispersion line 704, where a momentum change, or angular "kick," can be provided as a linear function of the angle of incidence. This is contrasted with a standard grating dispersion line 706, which may define the dispersion associated with an SRG, where no additional angular "kick" is provided. The angular "kick" enables the ability to compress and expand light waves that are received by the couplers in accordance with the discussion provided above with regard to the compression and expansion of images through a waveguide.

As noted earlier, for a standard grating, an incoming light wave at incident angle θ to the normal would receive a constant angular change β, and would therefore exit an SRG at an angle θ+β, represented by standard grating dispersion line 706. In contrast, an EADM can provide a compression/expansion ratio term which can be represented by a constant multiplicative term μ, such that for incident angles greater in magnitude, the angular "kick" would be greater. Upon interaction with the nanostructures, the outgoing angle would be μθ+β, which can result in an approximately linear relationship between incoming and outgoing angles. For example, portion 708 indicates that negative angles may be less deflected by use of a lesser term μ, while portion 710 indicates that positive angles can be more deflected by use of a higher term μ.

While a linear function can provide useful compression and expansion of images, another implementation can utilize a non-linearly deflecting EADM grating for additional benefits. For example, FIG. 8 depicts a graph 800, where for a given light wave 802, an EADM non-linear dispersion line 804 is shown, where the angular "kick" changes non-linearly over the angle of incidence, in contrast to standard grating dispersion line 806. Using a non-linear function can involve the use of a non-constant multiplicative term μ, and leveraging a non-linear function ƒ(θ), such that the compression/expansion ratio is not constant over the range of incident angles, resulting in an angular "kick" that varies over incident angle non-linearly. The outgoing angle can therefore be represented by ƒ(θ)+β, where ƒ(θ) is non-linear. As a result, portions 808 and 810 depict that near the edges of the FOV, the magnitude of the "kick" can be larger resulting in the periphery of the field of view being stretched, while portion 812 indicates that near the center of the FOV, there is less of an angular "kick."

The use of a non-linearly deflecting EADM can provide certain benefits over the linearly deflecting EADM discussed earlier. For example, non-linearly deflecting EADMs can be used to create a foveated image, and can also be used to compensate for distortion that may be introduced from a display engine, each of which will be described in further detail below. Non-linearly deflecting EADMs can, in certain implementations, be used either as an in-coupler or an out-coupler, or both. Furthermore, in certain implementations, the implementation of a non-linear function can be combined with the earlier discussed compression/expansion feature to be able to achieve larger FOVs without having to increase the refractive index of the waveguide substrate.

Figure 9:
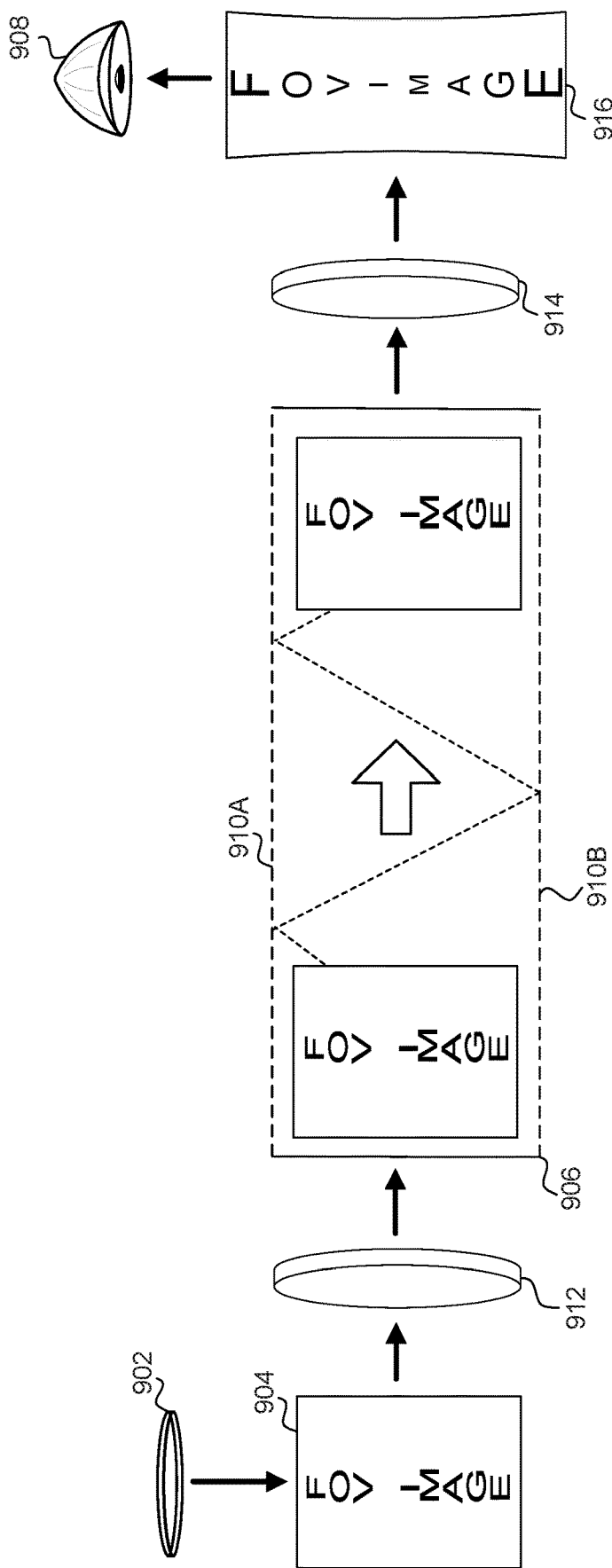

FIG. 9 depicts the processing of an image by NED device 100 according to one implementation using a non-linear function. An optical assembly 902 may generate an image 904 that is to be transmitted via a waveguide 906 such that the image may be propagated to a user's eye 908. In some implementations, waveguide 906 may be of a low index substrate, such as glass, that may be limited in its ability to guide certain light waves according to TIR.

Similar to the discussion earlier regarding FIG. 6, waveguide 906 may have a minimum TIR angle 910A and a maximum TIR angle 910B. As discussed, the FOV of a resulting image can therefore be based on the difference between the angles of incidence of the incoming light waves output from optical assembly 902 and the minimum and maximum TIR angles for waveguide 906, and if incoming light waves have a higher angle of incidence than the minimum and maximum TIR angles, certain portions of the resulting image can be cropped following out-coupling of the image from the waveguide.

As such, to avoid cropping of the image and to ensure that a wide FOV can be produced, image 904 can be generated by optical assembly 902 to fit within the critical angles of waveguide 906. Specifically, in certain implementations, optical assembly 902 may generate image 904 as an image having a FOV that is within the limits of the critical angles of waveguide 906 without any compression applied to the image, such as by precompensation processing discussed earlier. As such, as depicted in FIG. 9, image 904 may be an uncompressed image that does not exhibit distortion, in contrast to image 604.

Image 904, in its uncompressed form, can then be provided to in-coupler 912, which may be a standard grating in-coupler, such as an SRG that utilizes a constant angular "kick," without the necessity of utilizing metasurfaces for the in-coupler because the image 904 is already within the critical TIR angles of waveguide 906. Image 904 can then be transferred through waveguide 906 by TIR, and can be provided to out-coupler 914. Out-coupler 914 may be an EADM that utilizes a non-linear function to provide an angular "kick" for purposes of image expansion and to introduce foveation to image 904, resulting in foveated image 916, which can be propagated to user's eye 908. Foveated image 916 may exhibit different resolutions at different portions of the image.

Image foveation can be beneficial because visual perception toward the edge of a user's FOV drops significantly in resolution. As such, by concentrating display resolution within the center portion of the FOV and reducing display resolution toward edges, a larger FOV and/or effective resolution can be achieved with a reduction in computational requirements. As depicted by foveated image 916, a pincushion distortion optical function in out-coupler 914 can be used to achieve this foveation effect, where foveated image 916 displays portions of the image in the center in higher resolution (e.g., the "I" is displayed in normal size and resolution) while the edges of the image may appear stretched or elongated (e.g., the "F" and "E" may be displayed in such a manner as to appear stretched on the outer periphery of the image) or of lower resolution. Additionally, such a pincushion distortion optical function can be used to compensate for display parallax, which can tend to pack more pixels under the same angular range when a user looks at the waveguide under a large angle, which is known as the cosine effect.

While FIG. 9 depicts image 904 as being in an uncompressed state for ease of understanding, it is to be appreciated that image 904 may also be pre-warped by optical assembly 902, such that upon stretching by out-coupler 914, foveated image 916 would be correctly projected for propagation to user's eye 908.

Figure 10:
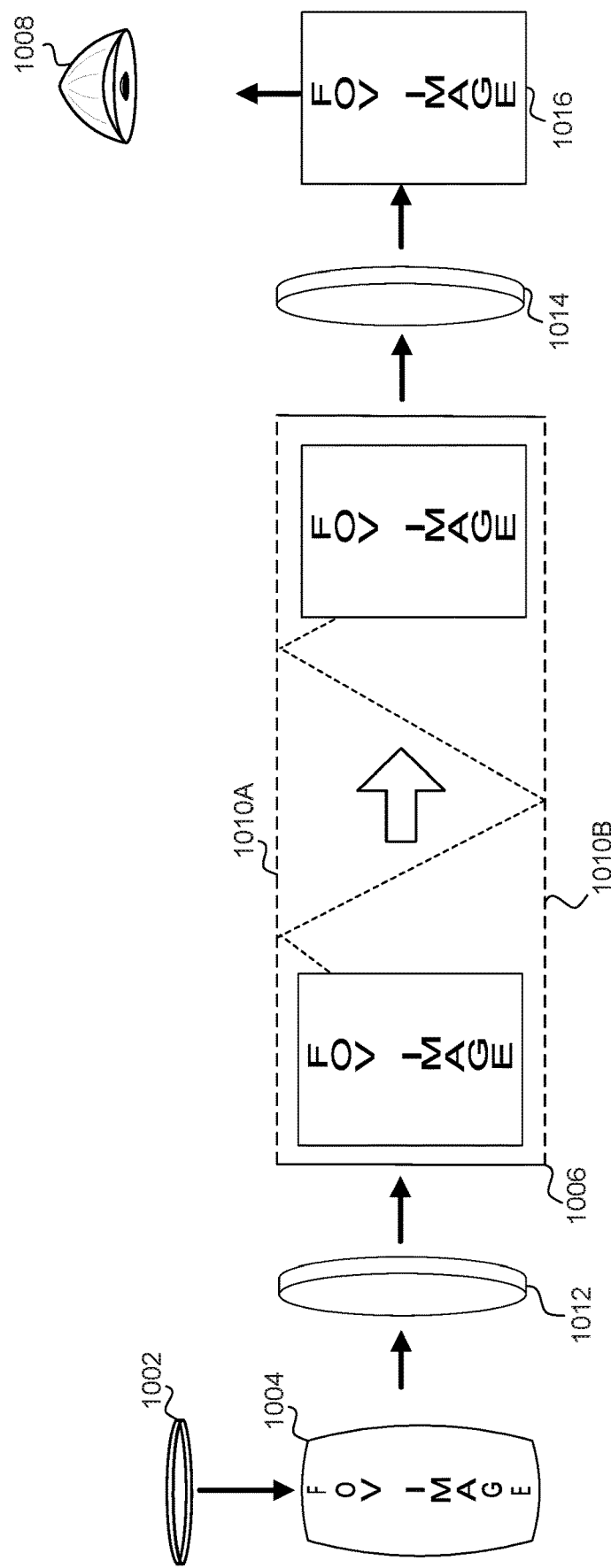

FIG. 10 depicts the processing of an image by NED device 100 according to another implementation using a non-linear function. An optical assembly 1002 may generate an image 1004 that is to be transmitted via a waveguide 1006 such that the image may be propagated to a user's eye 1008, within minimum TIR angle 1010A and maximum TIR angle 1010B of waveguide 1006.

As depicted in FIG. 10, image 1004 may have image distortion introduced by optical assembly 1002. For example, as depicted, barrel distortion from a MEMS-based scanning mirror light injector can occur, as in some implementations, a mirror driven with a sinusoidal angular velocity can move fastest in the center of the FOV and slowest toward the edges of the FOV. Therefore, as pixels are raster scanned in the center of the image, the light source needs to modulate more quickly to achieve the same or higher resolution in the center of the FOV than towards the edges of the FOV. Therefore, the use of the non-linearly deflecting EADM as an in-coupler can be used to compensative for such image distortions.

As such, to correct such image distortions, image 1004 can be provided to in-coupler 1012, which may be an EADM in-coupler that utilizes a non-linear function to compensate for barrel distortion from optical assembly 1002. Image 1004 can then be transferred through waveguide 1006 by TIR, and can be provided to out-coupler 1014. Out-coupler 1014 may be a standard grating in-coupler, such as an SRG, which can produce corrected image 1016 for propagation to user's eye 1008.

Furthermore, even in instances where image 1004 does not exhibit distortion, processing by an EADM utilizing such a non-linear function can be beneficial as this may allow for reduction of the modulation frequency of the light source in the middle of the FOV. This can therefore result in a lowering of required computational resources, lowered computational latency, and can also allow for the light source to be located farther away from the driver.

Figure 11:
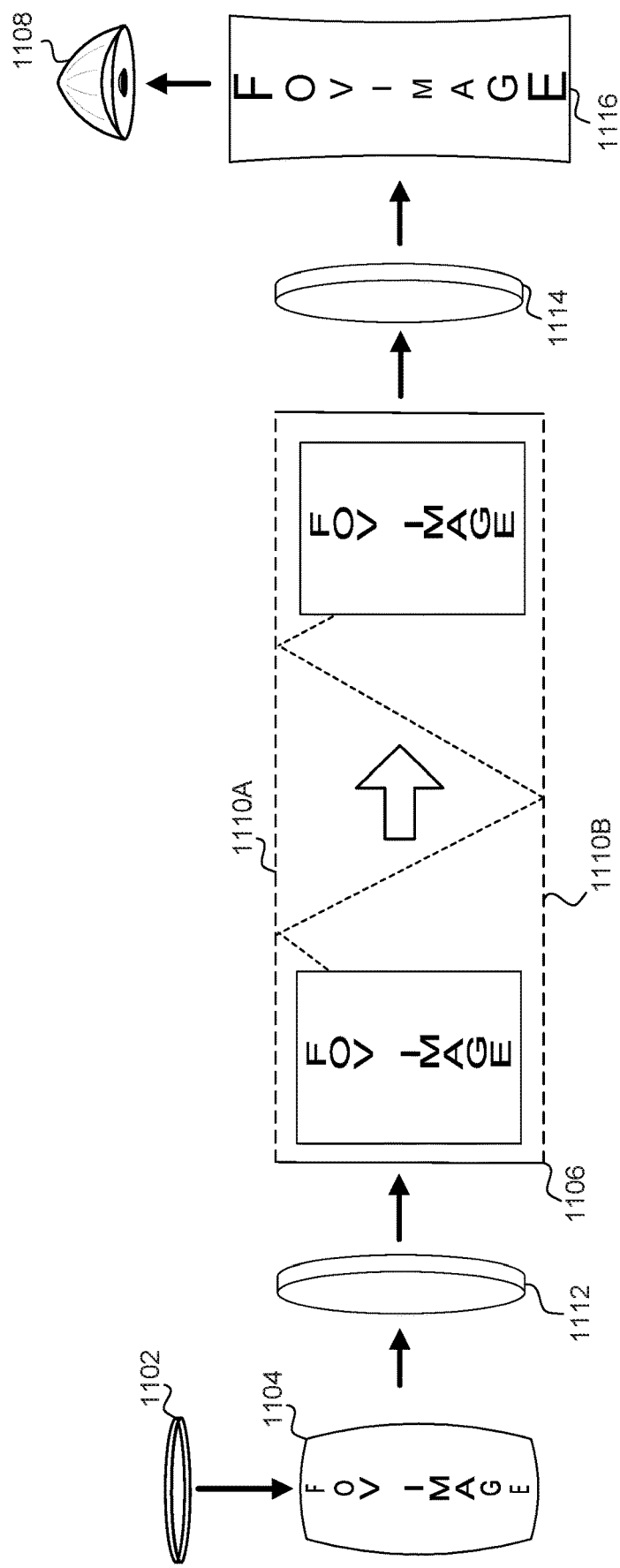

FIG. 11 depicts the processing of an image by NED device 100 according to another implementation using a non-linear function, and illustrates a combination of concepts set forth in FIGS. 9 and 10. An optical assembly 1102 may generate an image 1104 that is to be transmitted via a waveguide 1106 such that the image may be propagated to a user's eye 1108, within minimum TIR angle 1110A and maximum TIR angle 1110B of waveguide 1106.

As depicted in FIG. 11, image 1104 may have image distortion introduced by optical assembly 1102. For example, as depicted, barrel distortion from a MEMS-based scanning mirror light injector can occur, as set forth above regarding FIG. 10. Therefore, the use of the non-linearly deflecting EADM as an in-coupler can be used to compensative for such image distortions. As such, to correct such image distortions, image 1104 can be provided to in-coupler 1112, which may be an EADM in-coupler that utilizes a non-linear function to compensate for barrel distortion from optical assembly 1102. Image 1104 can then be transferred through waveguide 1106 by TIR, and can be provided to out-coupler 1114.

Out-coupler 1114 may be an EADM that utilizes a non-linear function to provide an angular "kick" for purposes of image expansion and to introduce foveation to image 1104, resulting in foveated image 1116, which can be propagated to user's eye 908. Foveated image 1116 may exhibit different resolutions at different portions of the image, but as a result of the distortion correction provided by in-coupler 1112, does not exhibit the image distortion introduced by optical assembly 1102.

Example Precompensation Method

Figure 12:
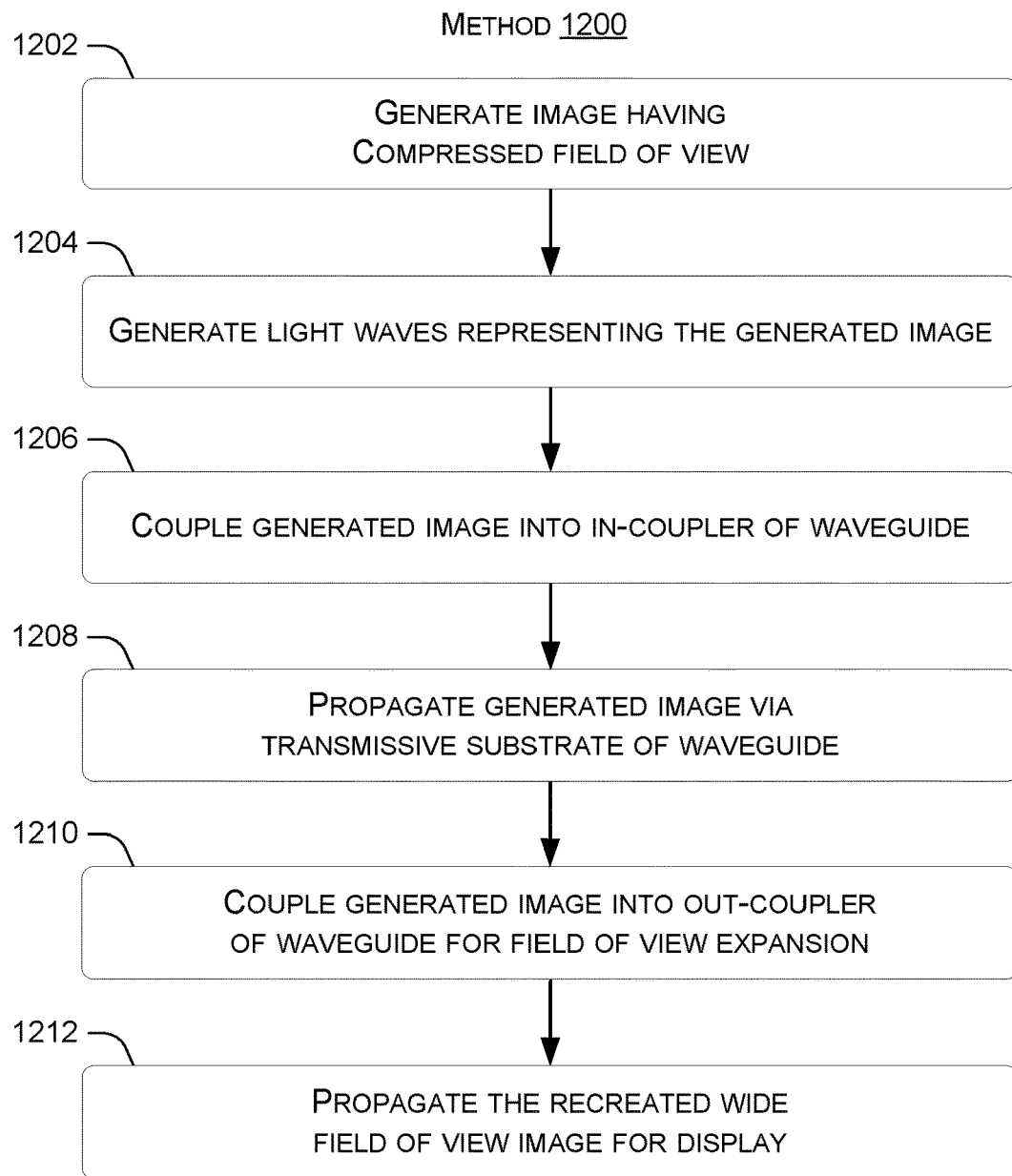
FIGS. 12 and 13 illustrate example methods or techniques that are consistent with some implementations of the present concepts.

The following discussion presents an overview of precompensation functionality described above. FIG. 12 illustrates an example method 1200, consistent with the present concepts. Method 1200 can be implemented by a single device, e.g., NED device 100, or various steps can be distributed over one or more servers, client devices, etc. Moreover, method 1200 can be performed by one or more components, such as precompensation renderer 112, light engine 114, display engine 116, and controller 118 of FIG. 1, and/or by other components.

At block 1202, precompensation renderer 112 may generate a compressed image, which in some implementations, may be based on a base image that has a wide FOV, and the compressed image can have a reduced FOV that is within the minimum and maximum TIR angles associated with a waveguide of NED device 100. In certain implementations, the amount of compression applied to the base image can be dependent on the material of the waveguide, and compression can be controlled until the FOV is within the critical TIR angles associated with the waveguide material. For example, NED device 100 may need to depict a particular image to a user of the device, and the image may have a wide field of view, such as 50 degrees. However, the waveguide material may not be able to transmit the 50-degree image, and therefore, the 50-degree image could be compressed to have a 30-degree field of view, which would fit within the critical TIR angles of the waveguide.

At block 1204, the generated image can be provided to light engine 114, which may produce light waves associated with the generated image.

At block 1206, the generated image can be coupled into the in-coupler of the waveguide. In certain implementations, the in-coupler of the waveguide may be a standard grating, such as a surface relief grating, that provides a constant deflection angle over all angles of incidence associated with the generated image.

At block 1208, the generated image can be propagated via a transmissive substrate of the waveguide. For example, the generated image can be propagated by TIR, which can propagate light waves from the in-coupler to the out-coupler of the waveguide.

At block 1210, the generated image can be coupled into the out-coupler of the waveguide for field of view expansion. Specifically, the out-coupler may be a metasurface grating, such as an EADM, which can provide a non-constant momentum "kick" to the light waves, in order to expand the field of view associated with the generated image, and therefore recreate the wide field of view that was originally processed by precompensation renderer 112.

Finally, at block 1212, the recreated wide field of view image can be propagated to enable displaying of the image to a user of NED device 100.

Example Angular Momentum Processing Method

Figure 13:
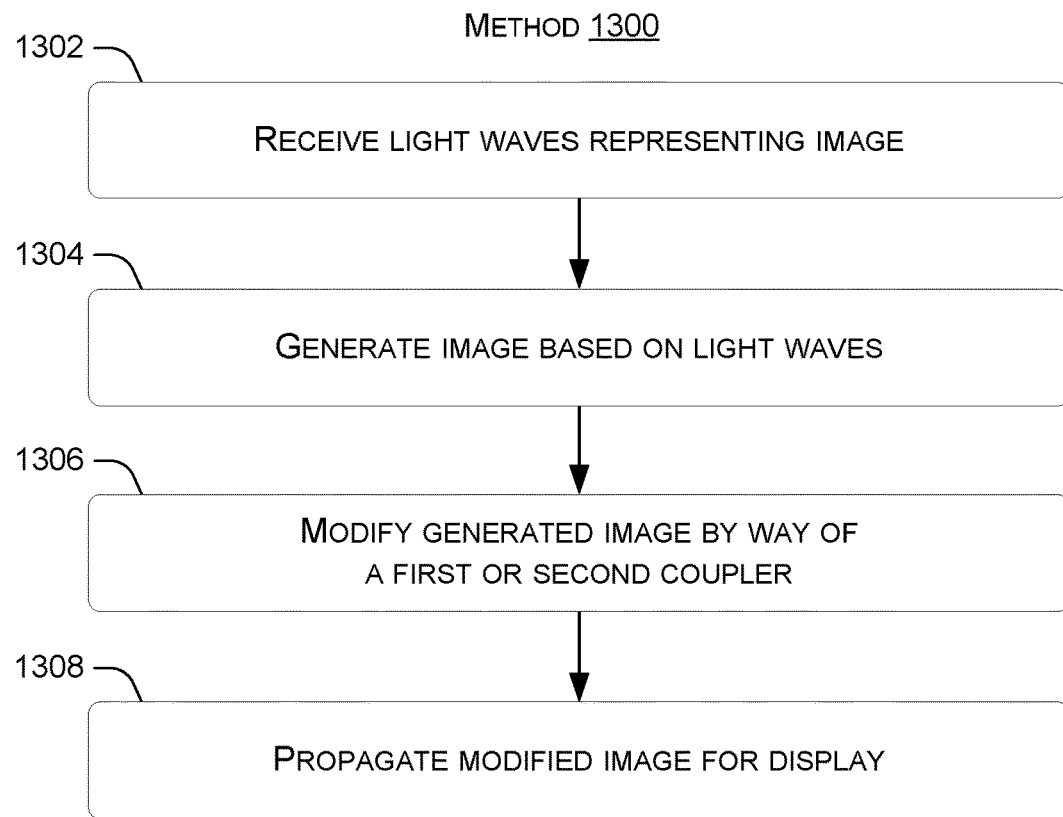

The following discussion presents an overview of non-linear angular momentum processing described above. FIG. 13 illustrates an example method 1300, consistent with the present concepts. Method 1300 can be implemented by a single device, e.g., NED device 100, or various steps can be distributed over one or more servers, client devices, etc. Moreover, method 1300 can be performed by one or more components, such as precompensation renderer 112, light engine 114, display engine 116, and controller 118 of FIG. 1, and/or by other components.

At block 1302, light engine 114 receive light waves that represent an image. For example, NED device 100 may need to depict a particular image to a user of the device. Light engine 114 may therefore produce light waves that depict the particular image, and the light waves can be propagated to display engine 116 for relay of the light waves.

At block 1304, display engine 116 may generate an image based on the light waves propagated from light engine 114. In certain instances, display engine 116 may introduce distortion to the generated image. For example, display engine 116 may introduce barrel distortion to the image. However, it is to be appreciated that display engine 116 may be capable of producing an undistorted image.

At block 1306, the generated image may be modified by way of the in-coupler or the out-coupler of the waveguide. For example, in certain implementations, the in-coupler utilize a standard grating so as to provide a constant momentum change to the generated image, and the out-coupler may utilize a metasurface grating that can provide a non-linear angular "kick" to the light waves associated with the generated image. In another implementation, the in-coupler may utilize a metasurface grating to provide the non-linear angular "kick," while the out-coupler utilizes a standard grating. In another implementation, both the in-coupler and the out-coupler may utilize a metasurface grating so as to provide non-linear angular "kicks" at both points. As discussed above, the non-linear angular "kick" provided by either the in-coupler or the out-coupler, or both, can be utilized to correct barrel distortion associated with the generated image, or to introduce image foveation to the generated image, resulting in a modified image.

Finally, at block 1308, the modified image can be propagated to enable displaying of the image to a user of NED device 100.

Device Implementations

As noted above with respect to FIG. 1, NED device 100 may include several components and/or devices, including an optical system 110, and a controller 118. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc. For example, a "precompensation system" can include one or more devices that perform precompensation, such as processing performed by NED device 100, or via devices externally connected to NED device 100.

Memory 122 can be storage resources that are internal or external to any respective devices with which it is associated. Memory 122 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 122.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Various device examples are described above. Additional examples are described below. One example includes a device comprising an optical assembly configured to generate an image for propagation from a first point of the device to a second point of the device via a waveguide having a transmissive substrate, an in-coupler, and an out-coupler, the in-coupler comprising a deflection grating that provides a constant deflection angle for angles of incidence associated with the generated image and being configured to propagate the generated image through the transmissive substrate of the waveguide to the out-coupler, and the out-coupler comprising a metasurface grating that provides a non-constant deflection angle for angles of incidence associated with the generated image, the metasurface grating increasing a field of view (FOV) of the generated image.

Another example can include any of the above and/or below examples where the device further comprises a light engine configured to generate light waves associated with a wide-FOV image.

Another example can include any of the above and/or below examples where the wide-FOV image has a FOV that is larger than minimum and maximum TIR angles associated with the transmissive substrate of the waveguide.

Another example can include any of the above and/or below examples where the generated image is generated by compressing the wide-FOV image by the optical assembly such that the FOV of the generated image is within the minimum and maximum TIR angles associated with the transmissive substrate of the waveguide.

Another example can include any of the above and/or below examples where the out-coupler expands the generated image to produce an expanded image having a FOV equal to the wide-FOV image.

Another example can include any of the above and/or below examples where the minimum and maximum TIR angles are based on a refractive index of the transmissive substrate of the waveguide.

Another example can include any of the above and/or below examples where wherein the transmissive substrate is a glass or polymer.

Another example can include any of the above and/or below examples where the in-coupler is a surface relief grating.

Another example can include any of the above and/or below examples where the out-coupler is a metasurface grating comprising a plurality of nanoscale elements Another example can include any of the above and/or below examples where generated image is propagated through the waveguide by total internal reflection (TIR).

Another example can include any of the above and/or below examples where the optical assembly is a MEMS-based scanning system.

Another example includes a method comprising generating an image that has a compressed field of view (FOV) based on a wide-FOV image, coupling the generated image into an in-coupler of a waveguide, the in-coupler having a first grating, propagating the generated image via a transmissive substrate of the waveguide, coupling the generated image into an out-coupler of the waveguide, the out-coupler having a second grating that provides FOV expansion to recreate the wide-FOV image, and propagating the recreated wide-FOV image for display.

Another example can include any of the above and/or below examples where the method further comprising generating light waves representing the generated image.

Another example can include any of the above and/or below examples where the wide-FOV image has a FOV that exceeds minimum and maximum FOV angles of the transmissive substrate of the waveguide.

Another example can include any of the above and/or below examples where the first grating is a surface relief grating.

Another example can include any of the above and/or below examples where the second grating is a metasurface grating comprising a plurality of nanoscale elements.

Another example includes a device comprising a renderer configured to process an image having a first field of view (FOV) to generate an image having a second FOV, a light engine configured to produce light waves based on the generated image having the second FOV, and a waveguide in-coupler configured to couple the produced light waves to a waveguide out-coupler via a transmissive substrate of the waveguide, the waveguide out-coupler configured to expand the generated image having the second FOV to recreate the first FOV.

Another example can include any of the above and/or below examples where the first FOV is wider than minimum and maximum FOV angles of the transmissive substrate of the waveguide, and the second FOV is within the minimum and maximum FOV angles.

Another example can include any of the above and/or below examples where the waveguide out-coupler is a metasurface grating comprising a plurality of nanoscale elements.

Another example can include any of the above and/or below examples where the waveguide in-coupler is a surface relief grating.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device comprising:
    an optical assembly configured to generate a compressed image based on an image for propagation from a first point of the device to a second point of the device via a waveguide having a transmissive substrate, an in-coupler, and an out-coupler, the image having a first field of view (FOV) that is larger than minimum and maximum total internal reflection (TIR) angles associated with the waveguide, the compressed image having a second FOV that is within the minimum and maximum TIR angles associated with the waveguide;
    the in-coupler comprising a deflection grating that provides a constant deflection angle for angles of incidence associated with the compressed image and being configured to propagate the compressed image through the transmissive substrate of the waveguide to the out-coupler; and
    the out-coupler comprising a metasurface grating that provides a non-constant deflection angle for angles of incidence associated with the compressed image, the metasurface grating expanding the second FOV of the compressed image.

2. The device of claim 1, further comprising a light engine configured to generate light waves associated with a wide-FOV image.

3. The device of claim 1, wherein the out-coupler expands the compressed image to produce an expanded image having the first FOV.

4. The device of claim 1, wherein the minimum and maximum TIR angles are based on a refractive index of the transmissive substrate of the waveguide.

5. The device of claim 1, wherein the transmissive substrate is a glass or polymer.

6. The device of claim 1, wherein the in-coupler is a surface relief grating.

7. The device of claim 1, wherein the out-coupler is a metasurface grating comprising a plurality of nanoscale elements.

8. The device of claim 1, wherein the compressed image is propagated through the waveguide by total internal reflection (TIR).

9. The device of claim 1, wherein the optical assembly is a MEMS-based scanning system.

10. The device of claim 1, wherein the compressed image precompensates for aberrations.

11. A method comprising:
    generating a compressed image that has a compressed field of view (FOV) based on a wide-FOV image that has a wide FOV;
    coupling the compressed image into an in-coupler of a waveguide, the in-coupler having a first grating;
    propagating the compressed image via a transmissive substrate of the waveguide;
    coupling the compressed image into an out-coupler of the waveguide, the out-coupler having a second grating that provides FOV expansion to recreate the wide-FOV image, the compressed FOV being within minimum and maximum TIR angles associated with the waveguide, the wide FOV exceeding the minimum and maximum TIR angles associated with the waveguide; and
    propagating the recreated wide-FOV image for display.

12. The method of claim 11, further comprising generating light waves representing the compressed image.

13. The method of claim 11, wherein the first grating is a surface relief grating.

14. The method of claim 11, wherein the second grating is a metasurface grating comprising a plurality of nanoscale elements.

15. The method of claim 11, wherein the out-coupler uses a linear momentum change.

16. The method of claim 11, wherein the out-coupler uses a nonlinear momentum change.

17. A device comprising:
- a renderer configured to process a first image having a first field of view (FOV) to generate a second image having a second FOV;
- a light engine configured to produce light waves based on the second image having the second FOV; and
- a waveguide in-coupler configured to couple the produced light waves to a waveguide out-coupler via a transmissive substrate of a waveguide;
- the waveguide out-coupler configured to expand the second image having the second FOV to recreate the first image having the first FOV, the first FOV being wider than minimum and maximum TIR angles associated with the waveguide, the second FOV being within the minimum and maximum TIR angles associated with the waveguide.

18. The device of claim 17, wherein the waveguide out-coupler is a metasurface grating comprising a plurality of nanoscale elements.

19. The device of claim 17, wherein the waveguide in-coupler is a surface relief grating.

20. The device of claim 17, wherein the waveguide out-coupler is configured to provide a nonlinear angular kick.

* * * * *